United States Patent
Arndt, III

(10) Patent No.: US 7,353,974 B2
(45) Date of Patent: Apr. 8, 2008

(54) THIGH-SUPPORTED GAME CALL HOLDER APPARATUS

(76) Inventor: James D. Arndt, III, 910 Stewart Ave., Wausau, WI (US) 54401

( * ) Notice: Subject to any disclaimer, the term of this patent is extended or adjusted under 35 U.S.C. 154(b) by 153 days.

(21) Appl. No.: 11/087,879

(22) Filed: Mar. 23, 2005

(65) Prior Publication Data
US 2005/0287901 A1    Dec. 29, 2005

Related U.S. Application Data

(60) Provisional application No. 60/556,305, filed on Mar. 26, 2004.

(51) Int. Cl.
- B62J 7/00 (2006.01)
- B62J 11/00 (2006.01)
- B60R 9/00 (2006.01)
- B60R 7/00 (2006.01)
- B60R 11/00 (2006.01)

(52) U.S. Cl. ............... 224/222; 224/448; 224/456; 224/461; 224/536; 224/558; 224/570

(58) Field of Classification Search ........ 224/222, 224/448, 456, 461, 536, 558, 570
See application file for complete search history.

(56) References Cited

U.S. PATENT DOCUMENTS

| | | | |
|---|---|---|---|
| 3,199,754 A | | 8/1965 | Sorensen |
| 3,917,205 A | * | 11/1975 | Meadors ............... 248/229.17 |
| 5,244,430 A | * | 9/1993 | Legursky ................. 446/397 |
| 5,615,817 A | * | 4/1997 | Shevers, Jr. ............. 224/267 |
| 5,820,000 A | | 10/1998 | Timberlake et al. |
| 5,947,353 A | | 9/1999 | Johnson |
| 5,988,469 A | * | 11/1999 | Musacchia ............... 224/267 |
| 6,308,876 B1 | | 10/2001 | Havens |
| 6,357,709 B1 | * | 3/2002 | Parduhn ............... 248/229.17 |

* cited by examiner

Primary Examiner—Nathan J. Newhouse
Assistant Examiner—Lester L. Vanterpool

(57) ABSTRACT

A body-mounted holder apparatus includes a rack member which includes bottom rack portions, riser rack portions extending upward from the bottom rack portions, and top rack portions supported by the riser rack portions. Strap members are connected to the bottom rack portions for securing the rack member to a user. A clamp assembly is connected to the top rack portions for holding a game call device. The strap members are used to encircle a portion of the user's body, e.g. a user's thigh, for securing the rack member to a user's body, leaving a free hand for carrying a weapon. The riser rack portions prevent a call device that is being supported by the apparatus from contacting the user and having its sound muffled thereby. Preferably, the strap members include first hook-or-loop connectors and complementary second hook-or-loop connectors.

4 Claims, 3 Drawing Sheets

THIGH-SUPPORTED GAME CALL HOLDER APPARATUS

CROSS-REFERENCE TO RELATED APPLICATION

This application claims priority based upon my copending Provisional Application Ser. No. 60/556,305; filed Mar. 26, 2004.

BACKGROUND OF THE INVENTION

1. Field of the Invention

The present invention relates generally to carriers for game call devices, and, more particularly, to game call carriers that are carried in a hands-free manner on a wearers body.

2. Description of the Prior Art

The use of game calls is well known by hunters. In the field, conventionally a hunter uses two hands to operate the game call device. Then, the hunter lets go of the game call device and grabs the hunting weapon with two hands. Following this routine, the hunter may experience a significant time delay between releasing the game call device from one's two hands and then grasping and aiming the weapon with two hands. To reduce this time delay, it would be desirable if a game call holder device were provided which permits the hunter to use only one hand to operate the game call device. It would be a lot faster for the hunter to aim the weapon after using only one hand for operating the game call device rather than using two hands. Also, if the hunter uses only one hand for operating the game call device, the hunter is able to use the other hand for carrying the weapon.

Throughout the years, a number of innovations have been developed relating to devices for carrying a game call device in a hands-free manner, and the following U.S. patents are representative of some of those innovations: U.S. Pat. Nos. 5,820,000, 5,947,353, 5,988,469, and 6,308,876. More specifically, U.S. Pat. No. 5,820,000 discloses a hands-free game call holder which is worn around the user's wrist. Because a hunter's weapon is used by one's hands, it would be desirable if a game call holder device were provided that is not worn on a hunter's wrist. Being on the hunter's wrist may interfere with the operation of the weapon with the hunter's hands.

U.S. Pat. No. 5,947,353 discloses a game call holder that is attached to a user's leg. More specifically, a turkey call is supported by plates which substantially contact the user's leg when the holder is supported by the user's leg. As a result, any sound that is made upon a support plate is damped or muffled by the plate's contact with the user's leg. In this respect, it would be desirable if a game call holder device were provided by which a game holder were held at a distance away from the user's body so that the user's leg will not damp or muffle the sound of the game call so that the game call can provide a true sound.

U.S. Pat. No. 5,988,469 discloses a game call holder attached to a user's thigh. A thigh strap and a belt-attached tether are used to support the holder on the user's thigh. in which both a thigh-attached portion and a belt attached portion are provided. Only a single strap is used to attach the holder to the thigh. This may account for the need for the additional belt attached tether to stabilize the holder. For purposes of simplicity of manufacture and use, it would be desirable if a game call holder were provided which did not need the use of a belt-attached tether to stabilize the holder.

U.S. Pat. No. 6,308,876 discloses a game call carrying system which can be carried on a user's thigh. A variety of game calls are stored in a tubular container that directly contacts the user's thigh. As stated above with respect to the discussion of U.S. Pat. No. 5,947,353, it would be desirable if a holder for a game call does directly contact a user's leg so that sound emitted from the game call will not be damped or muffled by the user's leg.

U.S. Pat. No. 3,199,754 may be of interest for its disclosure of cigarette case that is attachable to a user's body by means of adjustable straps.

Still other features would be desirable in a thigh-supported game call holder apparatus. Most often, game call holders store the game call within a compartment as the game call is being held by the holder. With such holders, the game call cannot be used for calling game as long as the game call is in the holder. In this respect, it would be desirable if a game call holder were provided that permits the game call to be used for calling game while the game call is held by the holder.

Game calls come in a variety of sizes. In this respect, it would be desirable if a game call holder device were provided that can be adjusted to support a variety of sizes of game calls, while permitting the game calls to used when being held by the holder.

Thus, while the foregoing body of prior art indicates it to be well known to use game call holders, the prior art described above does not teach or suggest a thigh-supported game call holder apparatus which has the following combination of desirable features: (1) permits a hunter to operate the game call device with only one hand; (2) is not worn on a hunter's wrist; (3) is held at a distance away from the user's leg so that the user's leg will not damp or muffle the sound of the game call so that the game call can provide a true sound; (4) does not use a belt-attached tether to stabilize the holder; (5) permits the game call to be used for calling game while the game call is held by the holder; and (6) can be adjusted to support a variety of sizes of game calls, while permitting the game calls to used when being held by the holder. The foregoing desired characteristics are provided by the unique thigh-supported game call holder apparatus of the present invention as will be made apparent from the following description thereof. Other advantages of the present invention over the prior art also will be rendered evident.

SUMMARY OF THE INVENTION

To achieve the foregoing and other advantages, the present invention, briefly described, provides a body-mounted holder apparatus which includes a rack member which includes bottom rack portions, riser rack portions extending upward from the bottom rack portions, and top rack portions supported by the riser rack portions. Strap members are connected to the bottom rack portions for securing the rack member to a user. A clamp assembly is connected to the top rack portions for holding a game call device. The strap members are used for securing the rack member to a user's body, leaving a free hand for carrying a weapon. The riser rack portions prevent a call device that is being supported by the apparatus from contacting the user and having its sound muffled thereby.

Preferably, the strap members include first hook-or-loop connectors and complementary second hook-or-loop connectors. The first hook-or-loop connectors and the second hook-or-loop connectors are connected together to secure the strap members to a user's body, such as the user's thigh.

Preferably, the clamp assembly includes a first clamp member, a second clamp member, and a member-to-member fastening assembly for fastening the first clamp member to the second clamp member. Preferably, each of the first clamp member and the second clamp member includes a semicircular C-shaped central section and straight end sections which are connected to respective ends of the semicircular C-shaped central sections.

The member-to-member fastening assembly includes bolts, bolt-reception channels in the straight end sections of the clamp members, and nuts for connection with the bolts. In addition, the member-to-member fastening assembly includes internally threaded extension nuts for extending the effective lengths of the bolts. Also, the member-to-member fastening assembly includes threaded extension rods which are screwed into the internally threaded extension nuts so that the first clamp member and the second clamp member can be separated by greater distances than provided by bolts alone.

The clamp assembly can be connected to the top rack portions by means of connector straps and complementary hook-or-loop strap connectors.

The above brief description sets forth rather broadly the more important features of the present invention in order that the detailed description thereof that follows may be better understood, and in order that the present contributions to the art may be better appreciated. There are, of course, additional features of the invention that will be described hereinafter and which will be for the subject matter of the claims appended hereto.

In this respect, before explaining a preferred embodiment of the invention in detail, it is understood that the invention is not limited in its application to the details of the construction and to the arrangements of the components set forth in the following description or illustrated in the drawings. The invention is capable of other embodiments and of being practiced and carried out in various ways. Also, it is to be understood, that the phraseology and terminology employed herein are for the purpose of description and should not be regarded as limiting.

As such, those skilled in the art will appreciate that the conception, upon which disclosure is based, may readily be utilized as a basis for designing other structures, methods, and systems for carrying out the several purposes of the present invention. It is important, therefore, that the claims be regarded as including such equivalent constructions insofar as they do not depart from the spirit and scope of the present invention.

It is therefore an object of the present invention to provide a new and improved thigh-supported game call holder apparatus which has all of the advantages of the prior art and none of the disadvantages.

It is another object of the present invention to provide a new and improved thigh-supported game call holder apparatus which may be easily and efficiently manufactured and marketed.

It is a further object of the present invention to provide a new and improved thigh-supported game call holder apparatus which is of durable and reliable construction.

An even further object of the present invention is to provide a new and improved thigh-supported game call holder apparatus which is susceptible of a low cost of manufacture with regard to both materials and labor, and which accordingly is then susceptible of low prices of sale to the consuming public, thereby making such thigh-supported game call holder apparatus available to the buying public.

Still yet a further object of the present invention is to provide a new and improved thigh-supported game call holder apparatus which permits a hunter to operate the game call device with only one hand.

Still another object of the present invention is to provide a new and improved thigh-supported game call holder apparatus that is not worn on a hunter's wrist.

Yet another object of the present invention is to provide a new and improved thigh-supported game call holder apparatus which is held at a distance away from the user's leg so that the user's leg will not damp or muffle the sound of the game call so that the game call can provide a true sound.

Even another object of the present invention is to provide a new and improved thigh-supported game call holder apparatus that does not use a belt-attached tether to stabilize the holder.

Still a further object of the present invention is to provide a new and improved thigh-supported game call holder apparatus which permits the game call to be used for calling game while the game call is held by the holder.

Yet another object of the present invention is to provide a new and improved thigh-supported game call holder apparatus that can be adjusted to support a variety of sizes of game calls, while permitting the game calls to used while being held by the holder.

These together with still other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there are illustrated preferred embodiments of the invention.

BRIEF DESCRIPTION OF THE DRAWINGS

The invention will be better understood and the above objects as well as objects other than those set forth above will become more apparent after a study of the following detailed description thereof. Such description makes reference to the annexed drawing wherein.

DESCRIPTION OF THE PREFERRED EMBODIMENT

Figure 1:
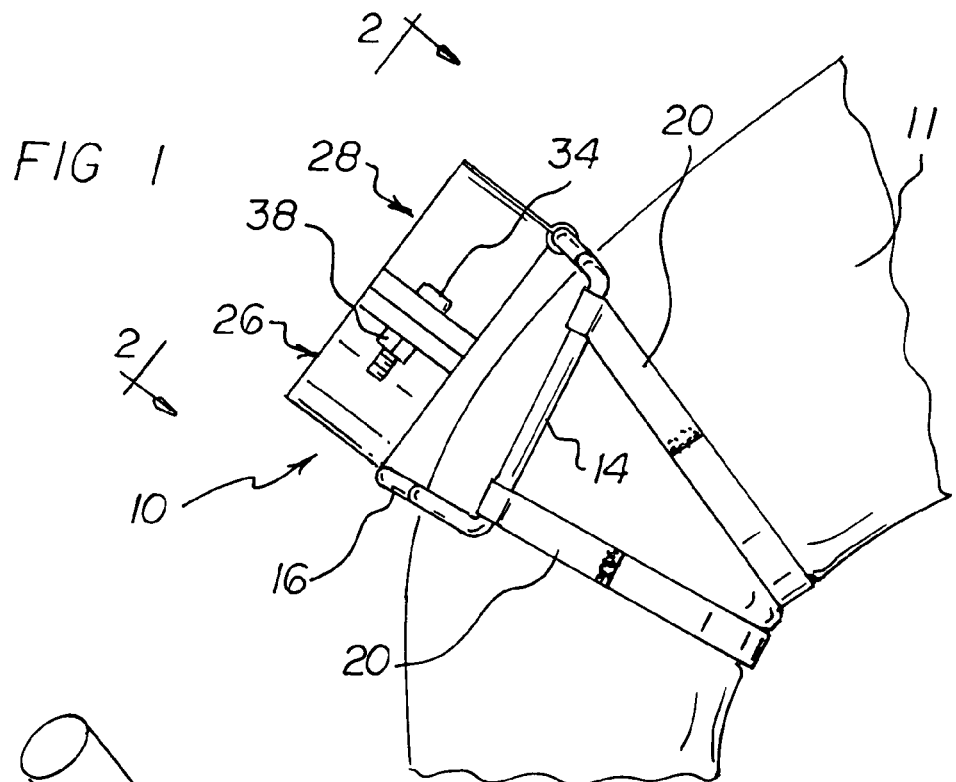
FIG. 1 is a side view showing a preferred embodiment of the thigh-supported game call holder apparatus of the invention supported by a user's thigh and holding a first call device.

With reference to the drawings, a new and improved thigh-supported game call holder apparatus embodying the principles and concepts of the present invention will be described.

Turning to FIGS. 1-5, there is shown a preferred embodiment of the thigh-supported game call holder apparatus of the invention generally designated by reference numeral 10. In the preferred embodiment, a body-mounted holder apparatus 10 includes a rack member 12 which includes bottom rack portions 14, riser rack portions 16 extending upward from the bottom rack portions 14, and top rack portions 18 supported by the riser rack portions 16. Strap members 20 are connected to the bottom rack portions 14 for securing the rack member 12 to a user. A clamp assembly is connected to the top rack portions 18 for holding a game call device. The strap members 20 are used for securing the rack member 12 to a user's body, leaving a free hand for carrying a weapon.

Preferably, the strap members 20 include first hook-or-loop connectors 22 and complementary second hook-or-loop connectors 24. The first hook-or-loop connectors 22 and the second hook-or-loop connectors 24 are connected together to secure the strap members 20 to a user's body, such as the user's thigh. The first hook-or-loop connectors 22 and the second hook-or-loop connectors 24 can be made from well known VELCRO(™) material.

Preferably, the clamp assembly includes a first clamp member 26, a second clamp member 28, and a member-to-member fastening assembly for fastening the first clamp member 26 to the second clamp member 28. Preferably, each of the first clamp member 26 and the second clamp member 28 includes a semicircular C-shaped central section 30 and straight end sections 32 which are connected to respective ends of the semicircular C-shaped central sections 30.

The member-to-member fastening assembly includes bolts 34, bolt-reception channels 36 in the straight end sections 32 of the clamp members, and nuts 38 for connection with the bolts 34. In addition, the member-to-member fastening assembly includes internally threaded extension nuts 40 for extending the effective lengths of the bolts 34. Also, the member-to-member fastening assembly includes threaded extension rods 46 which are screwed into the internally threaded extension nuts 40 so that the first clamp member 26 and the second clamp member 28 can be separated by greater distances than provided by bolts 34 alone.

The clamp assembly can be connected to the top rack portions 18 by means of connector straps 42 and complementary hook-or-loop strap connectors 44.

To use the holder apparatus 10 of the invention, the desired call device is secured to the clamp assembly. To do so, the first clamp member 26 and the second clamp member 28 are separated from each other. The bolts 34 are threaded through the respective bolt-reception channels 36, and the nuts 38 are screwed onto the ends of the bolts 34. The call device is placed between the first clamp member 26 and the second clamp member 28, and the nuts 38 are tightened on the bolts 34 to firmly clamp the call device between the first clamp member 26 and the second clamp member 28. Care is taken to make sure that the bottom of the call device remains above the top rack portions 18. In this way, when the holder apparatus 10 is worn by a user, the riser rack portions 16 keep the call device separated from the limb of the user.

Once the call device is installed in the holder apparatus 10 of the invention, the holder apparatus 10 can be worn by the user. To do so, the bottom rack portions 14 are placed against a selected portion of one of the user's limbs, such as against a thigh, and the strap members 20 are wrapped circumferentially around the thigh. Then, the first hook-or-loop connectors 22 and the second hook-or-loop connectors 24 are connected together to secure the apparatus onto the thigh.

The bottom rack portions 14 can includes curved portions which are complementary with the curve of the thigh. When the holder apparatus 10 is worn on a thigh, the call device is prevented from touching the thigh by the riser rack portions 16. With the call device not touching the thigh of the user, the call device can have a clear sound when struck by the sounding stick 13, without being muffled or damped by the user's thigh. In this respect, the apparatus of the invention permits a call device to be supported on a user's body with allowing the call device to emit a true sound.

A significant advantage of the holder apparatus 10 of the invention is that a user is allowed to use a call device with only one hand, leaving the other hand free to hold a weapon or other object. As a result, the user can quickly take aim at game immediately after the call device has been used. Moreover, since the user can aim a weapon shortly after making a call, the apparatus permits a user to quickly use the weapon after making the call.

Figure 2:
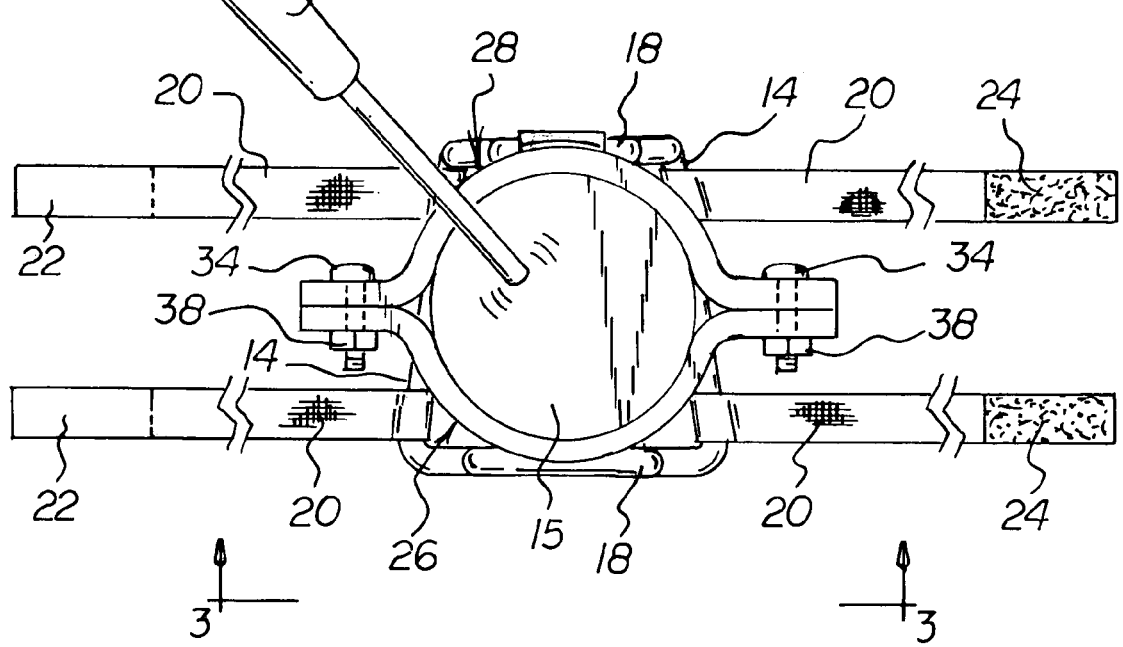
FIG. 2 is a top view of the embodiment of the thigh-supported game call holder apparatus shown in FIG. 1, taken along line 2-2, removed from the thigh, and being struck by a sounding stick.
Figure 3:
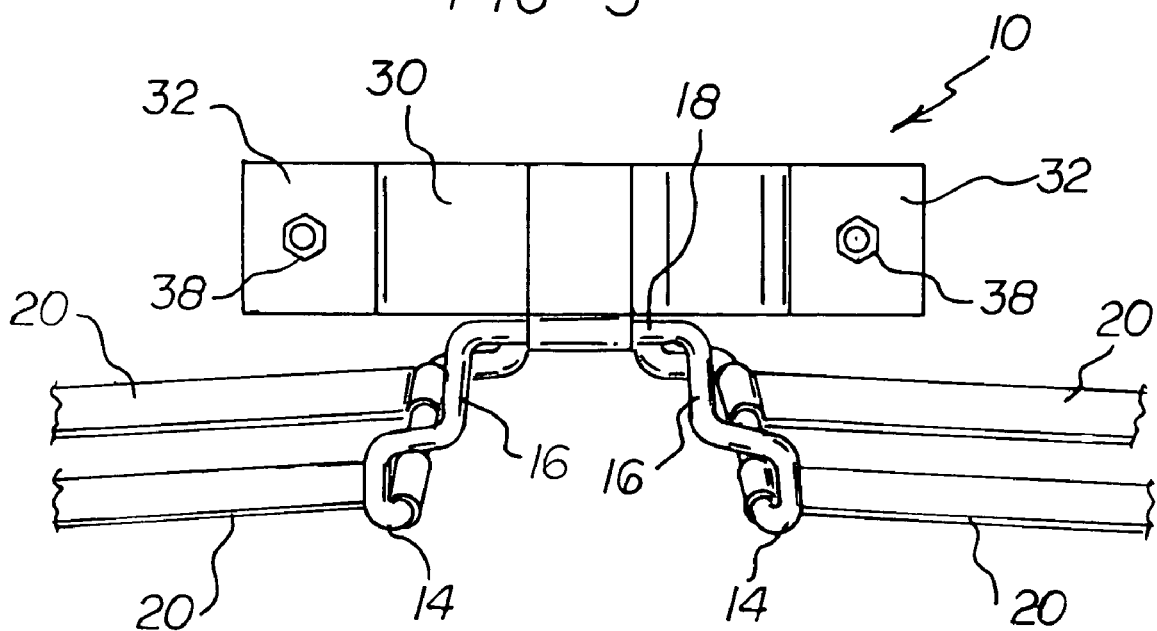
FIG. 3 is a side view of the embodiment of the thigh-supported game call holder apparatus of FIG. 2 taken along line 3-3 thereof.

The holder apparatus 10 of the invention can be used for supporting a first call device 15 which can be a circular call device such as a circular turkey call, as shown in FIGS. 1-3. The turkey call has a relatively small diameter, and for clamping the turkey call in the clamp assembly, the first clamp member 26 and the second clamp member 28 are close together to form a continuous circle around the circular turkey call. The first clamp member 26 and the second clamp member 28 are secured together with bolts 34 and nuts 38.

Figure 4:
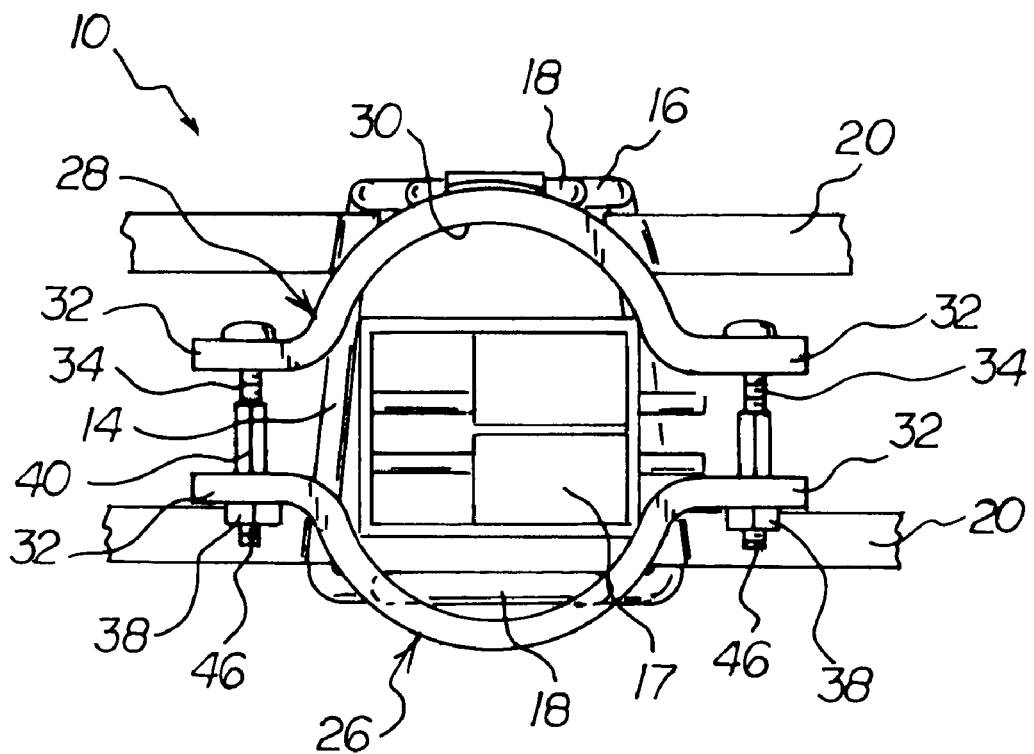
FIG. 4 is a partial top view of the embodiment of the thigh-supported game call holder apparatus shown in FIG. 2, being used to hold a second call device.
Figure 5:
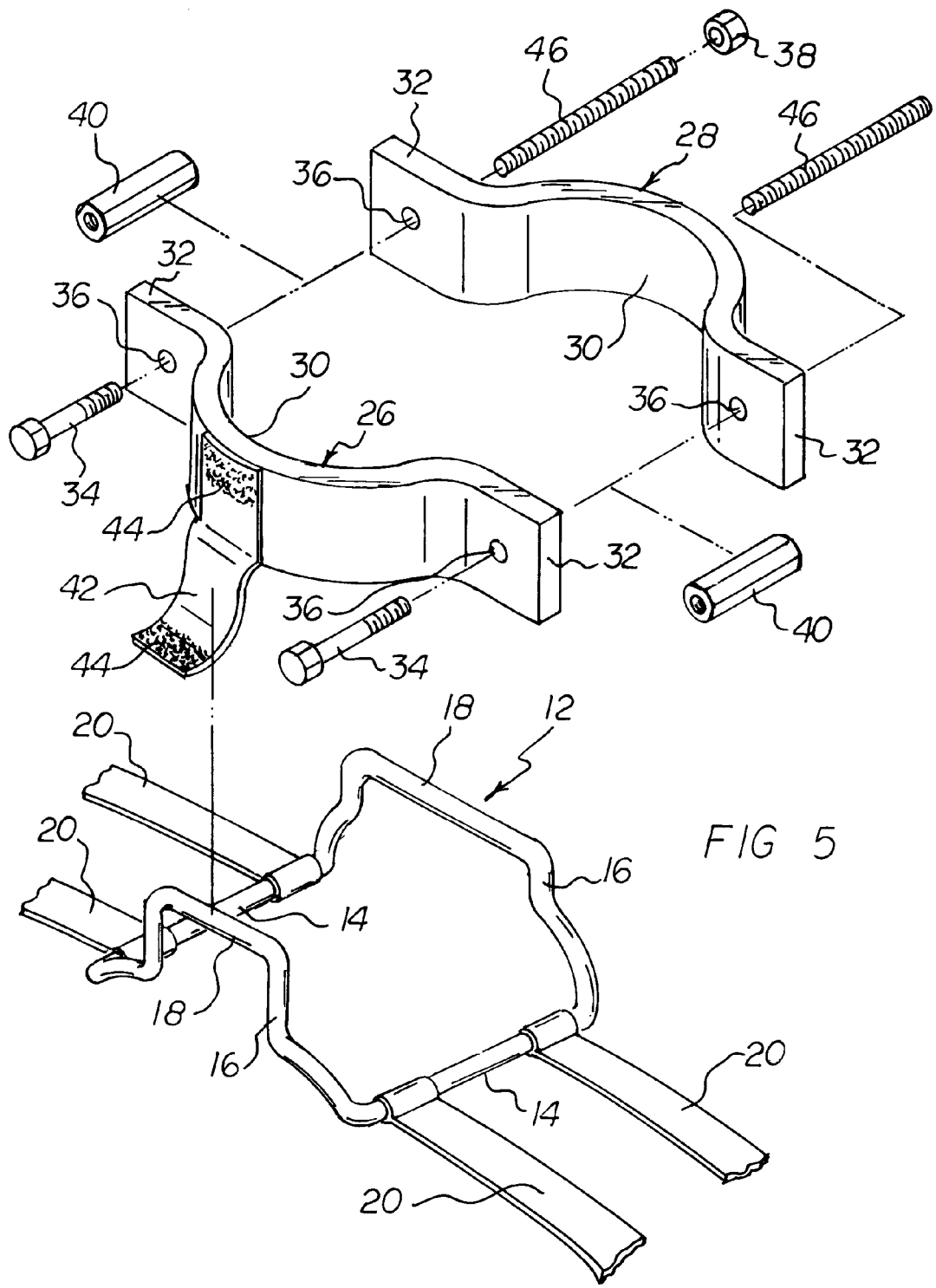
FIG. 5 is an exploded perspective view of the embodiment of the invention shown in FIG. 4.

As shown in FIG. 4, the holder apparatus 10 of the invention can be used for holding a larger second call device 17 which is a rectangular-shaped call device, such as a box call or a slate. With the larger rectangular call device 17, the first clamp member 26 and the second clamp member 28 are separated from each other, and two corners of the rectangular call device 17 are in contact with the first clamp member 26, and two corners of the rectangular call device 17 are in contact with the second clamp member 28.

By themselves, the bolts 34 are too short for securing the first clamp member 26 to the second clamp member 28 with the larger second call device 17 therebetween. In this case, the internally threaded extension nuts 40 are screwed onto ends of the bolts 34, and threaded extension rods 46 are screwed into the internally threaded extension nuts 40. Then, nuts 38 are screwed onto the free ends of the threaded extension rods 46.

In general, the use of the internally threaded extension nuts 40 and the threaded extension rods 46 permit the first clamp member 26 and the second clamp member 28 to be separated from each other at extended distances to accommodate call devices has a wide variety of sizes. In this respect, the bolts 34, the internally threaded extension nuts 40, and the threaded extension rods 46 provide a universal support for a wide variety of game calls.

The components of the thigh-supported game call holder apparatus of the invention can be made from inexpensive and durable metal and plastic materials.

The components of the thigh-supported game call holder apparatus of the invention can be made from inexpensive and durable metal and plastic materials.

As to the manner of usage and operation of the instant invention, the same is apparent from the above disclosure, and accordingly, no further discussion relative to the manner of usage and operation need be provided.

It is apparent from the above that the present invention accomplishes all of the objects set forth by providing a new and improved thigh-supported game call holder apparatus that is low in cost, relatively simple in design and operation, and which may advantageously be used to permit a hunter to operate a game call device with only one hand. With the invention, a thigh-supported game call holder apparatus is provided which is not worn on a hunter's wrist. With the invention, a thigh-supported game call holder apparatus is provided which is held at a distance away from the user's leg so that the user's leg will not damp or muffle the sound of the game call so that the game call can provide a true sound. With the invention, a thigh-supported game call holder apparatus is provided which does not use a belt-attached tether to stabilize the holder. With the invention, a thigh-supported game call holder apparatus is provided which permits the game call to be used for calling game while the game call is held by the holder. With the invention, a thigh-supported game call holder apparatus is provided which can be adjusted to support a variety of sizes of game calls, while permitting the game calls to used when being held by the holder.

Thus, while the present invention has been shown in the drawings and fully described above with particularity and detail in connection with what is presently deemed to be the most practical and preferred embodiment(s) of the invention, it will be apparent to those of ordinary skill in the art that many modifications thereof may be made without departing from the principles and concepts set forth herein, including, but not limited to, variations in size, materials, shape, form, function and manner of operation, assembly and use.

Hence, the proper scope of the present invention should be determined only by the broadest interpretation of the appended claims so as to encompass all such modifications as well as all relationships equivalent to those illustrated in the drawings and described in the specification.

Finally, it will be appreciated that the purpose of the annexed Abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. Accordingly, the Abstract is neither intended to define the invention or the application, which only is measured by the claims, nor is it intended to be limiting as to the scope of the invention in any way.

What is claimed as being new and desired to be protected by Letters Patent of the United States is as follows:

1. A holder apparatus, comprising:
   a rack member which includes bottom rack portions, riser rack portions extending upward from said bottom rack portions, and top rack portions supported by said riser rack portions,
   strap members connected to said bottom rack portions for securing said rack member to a user, and
   a clamp assembly connected to said top rack portions, wherein said clamp assembly includes:
   a first clamp member,
   a second clamp member,
   a member-to-member fastening assembly for fastening said first clamp member to said second clamp member, and
   wherein each of said first clamp member and said second clamp member includes:
   a semicircular C-shaped central section, and
   straight end sections connected to respective ends of said semicircular C-shaped central sections,
   and wherein said strap members are used for securing said rack member to a user's thigh, and
   wherein said strap members include:
   first hook-or-loop connectors, and
   complementary second hook-or-loop connectors,
   wherein said first hook-or-loop connectors and said second hook-or-loop connectors are connected together to secure said strap members to said user's thigh.

2. The apparatus of claim 1 wherein said member-to-member fastening assembly includes:
   bolts,
   bolt-reception channels in said straight end sections of said clamp members, and
   nuts for connection with said bolts.

3. The apparatus of claim 2, further including:
   internally threaded extension nuts received on said bolts, and
   threaded extension rods screwed into said internally threaded extension nuts.

4. A holder apparatus, comprising:
   a rack member which includes bottom rack portions, riser rack portions extending upward from said bottom rack portions, and top rack portions supported by said riser rack portions,
   strap members connected to said bottom rack portions for securing said rack member to a user, and
   a clamp assembly connected to said top rack portions, wherein said clamp assembly includes:
   a first clamp member,
   a second clamp member,
   a member-to-member fastening assembly for fastening said first clamp member to said second clamp member, and
   wherein each of said first clamp member and said second clamp member includes:
   a semicircular C-shaped central section, and
   straight end sections connected to respective ends of said semicircular C-shaped central sections, and
   wherein said clamp assembly is connected to said top rack portions by means of connector straps and complementary hook-or-loop strap connectors.

* * * * *